(12) United States Patent
Xu et al.

(10) Patent No.: US 12,174,086 B2
(45) Date of Patent: Dec. 24, 2024

(54) TYPE-II AEBS TEST AND EVALUATION DEVICE AND METHOD BASED ON BeiDou SPACE-TIME REFERENCE

(71) Applicant: Southeast University, Nanjing (CN)

(72) Inventors: Qimin Xu, Nanjing (CN); Xu Li, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 230 days.

(21) Appl. No.: 17/784,806

(22) PCT Filed: Sep. 23, 2021

(86) PCT No.: PCT/CN2021/119788
§ 371 (c)(1),
(2) Date: Jun. 13, 2022

(87) PCT Pub. No.: WO2022/095617
PCT Pub. Date: May 12, 2022

(65) Prior Publication Data
US 2023/0013071 A1    Jan. 19, 2023

(30) Foreign Application Priority Data
Nov. 3, 2020    (CN) .......................... 202011207571.4

(51) Int. Cl.
*G01M 17/007*    (2006.01)
*G07C 5/00*    (2006.01)
*G08G 1/01*    (2006.01)

(52) U.S. Cl.
CPC .......... *G01M 17/007* (2013.01); *G07C 5/008* (2013.01); *G08G 1/0116* (2013.01)

(58) Field of Classification Search
CPC ... G01M 17/007; G07C 5/008; G08G 1/0116; G01L 5/28; G06F 18/24; G08B 7/06
See application file for complete search history.

(56) References Cited

U.S. PATENT DOCUMENTS

| | | | |
|---|---|---|---|
| 2016/0272201 A1 | 9/2016 | Kang et al. | |
| 2020/0072968 A1* | 3/2020 | Shi | .......... G01S 13/931 |
| 2020/0339109 A1* | 10/2020 | Hong | .......... B60W 30/08 |

FOREIGN PATENT DOCUMENTS

| | | |
|---|---|---|
| CN | 102289952 A | 12/2011 |
| CN | 102737511 A | 10/2012 |

(Continued)

OTHER PUBLICATIONS

Wikipedia, GPS Signals, 2020 (Year: 2020).*

*Primary Examiner* — Alan D Hutchinson
(74) *Attorney, Agent, or Firm* — MUNCY, GEISSLER, OLDS & LOWE, P.C.

(57) ABSTRACT

Disclosed are a Type-II Autonomous Emergency Braking System (AEBS) test and evaluation device and method based on a BeiDou space-time reference, where the device includes three parts: a roadside-end information acquisition module, a vehicle-end information acquisition module, and an integrated information processing module. The roadside-end information acquisition module can acquire accurate message sending time by means of a BeiDou time service unit: the vehicle-end information acquisition module can acquire accurate time of receiving a roadside-end message, information acquired by a combined inertial navigation unit, and audio/vibration information acquired by a Single Chip Microcomputer (SCM) embedded unit; and the integrated information processing module can implement accurate, quantitative test and evaluation of indexes such as a vehicle-road communication delay and warning signal sending time. The method of the present disclosure performs data analysis and processing based on a globally unified BeiDou space-time reference and by means of a Support Vector Machine (SVM)-based dynamic Hermite interpolation method, which has an accurate test and evaluation result. Further, the method does not have any requirements for a communica- (Continued)

tion system of the type-II AEBS, thus achieving convenient testing and a wide range of application.

2 Claims, 3 Drawing Sheets

(56)     References Cited

FOREIGN PATENT DOCUMENTS

| | | | |
|---|---|---|---|
| CN | 104537889 A | 4/2015 |
| CN | 108490920 A | 9/2018 |
| CN | 111649955 A | 9/2020 |
| CN | 112525543 A | 3/2021 |

* cited by examiner

TYPE-II AEBS TEST AND EVALUATION DEVICE AND METHOD BASED ON BeiDou SPACE-TIME REFERENCE

TECHNICAL FIELD

The present disclosure relates to a test and evaluation device and method for a type-II Autonomous Emergency Braking System (AEBS), and more particularly to a type-II AEBS test and evaluation device and method based on a BeiDou space-time reference, which belongs to the field of intelligent driving test and evaluation.

BACKGROUND

The AEBS is an active safety system that identifies, based on an environmental awareness sensor (millimeter-wave radar, a camera, etc.), the risk of collision with vehicles, pedestrians or other traffic participants in front to provide warning, and further implements braking by the system automatically triggering an actuator, so as to avoid or mitigate a collision.

The AEBS has been promoted as a pioneer of intelligent driving technology in the road transport industry. The European Union has mandated the installation of the AEBS in newly registered N2, N3, M2, and M3 commercial vehicles since Nov. 1, 2013. China has also set up relevant standards, including GB/T 38186-2019 Performance Requirements and Test Methods for Automatic Emergency Braking System of Commercial Vehicles, JT/T 1242-2019 Performance Requirements and Test Procedures for Automatic Emergency Braking System of Operating Vehicles, etc.; and related AEBS test methods are also given in the standards.

The AEBS is required to perform fusion decision processing for multi-source information in both the identification and decision-making process of collision risk; and has low reliability, a narrow application scope, and poor practicability if only relying on single-source information. With the development of vehicle-road collaboration technology, the AEBS is no longer limited to traditional vehicle sensors such as vision and radar sensors. Vehicle-road communication sensors can work in all-weather and all-terrain conditions, providing an important information source for the AEBS, and thus, AEBSs based on vehicle-road communication emerge. In order to make a distinction, the AEBS with the vehicle-road communication function is referred to as a type-II AEBS, while the AEBS without the vehicle-road communication function is referred to as a type-I AEBS in the JT/T 1242-2019 standard. The performance of the type-II AEBS is also regulated in the JT/T 1242-2019 standard, including types of received and sent information, a direct communication delay, a communication distance, a warning issuing time, etc. However, this standard only stipulates the performance requirements and test scenarios for the type-II AEBS, but does not describe a test process and an evaluation method in detail.

A test and evaluation method for the type-I AEBS has already been reported in related invention patents, including a simulated test and evaluation method (VERIFICATION METHOD FOR AUTOMATIC EMERGENCY BRAKING SYSTEM AND CORRESPONDING VERIFICATION SYSTEM, application No. 201310089393.3), a real vehicle test and evaluation method (INTELLIGENT DRIVING AUTOMATIC EMERGENCY BRAKING PERFORMANCE TEST AND EVALUATION METHOD FOR COMBINED TEST ROAD, application No. 202010028039.X), etc. However, a test and evaluation method for the type-II AEBS has not yet been publicly reported. This patent discloses a performance test and evaluation method for the type-II AEBS, which specifically describes a test and evaluation method for two indexes: a vehicle-road communication delay and whether to issue a warning when the time to collision (TTC) is greater than 2.7 s to 4.4 s. The JT/T 1242-2019 standard requires that the type-II AEBS should have a vehicle-road communication function of "issuing a warning when the TTC or ETTC is greater than 2.7 s to 4.4 s", and further stipulates that "the first-level warning should be generated 1.4 s before the emergency braking phase, and the second-level warning should be generated 0.8 s before the emergency braking phase" in the warning manner. Therefore, the type-II AEBS is only required to make the first-level warning, namely, one of the auditory and tactile warnings. Identification of the warning signal from the type-II AEBS is identification of the auditory or tactile warning. The present disclosure unifies the sending and receiving time of vehicle-road communication messages and the warning signal sending time to the BeiDou time reference, thus implementing test and evaluation of whether the vehicle-road communication delay and the warning issuing time during the vehicle-road communication in the type-II AEBS meet the standard requirements.

SUMMARY

The present disclosure aims to provide a type-II AEBS test and evaluation device based on a BeiDou space-time reference, which includes three parts: a roadside-end information acquisition module, a vehicle-end information acquisition module, and an integrated information processing module. The roadside-end information acquisition module is mounted at the road side, and the vehicle-end information acquisition module and the integrated information processing module are mounted in a test vehicle, which can implement accurate and reliable test and evaluation for the type-II AEBS in a typical scenario based on the globally unified BeiDou space-time reference and by means of multi-target sensor fusion technology.

The present disclosure adopts the following technical solution: A type-II AEBS test and evaluation method based on a BeiDou space-time reference is provided, which is characterized in that: the present disclosure establishes a globally unified BeiDou space-time reference according to the characteristics of the type-II AEBS with a vehicle-road communication function; measures basic parameter information of the roadside end and vehicle end separately; and further implements accurate, quantitative test and evaluation of indexes such as a vehicle-road communication delay and warning signal sending time by means of multi-target sensor fusion technology. The method specifically includes the following steps:

Step 1: Establishment of the Roadside-End Information Acquisition Module and Parameter Measurement The roadside-end information acquisition module includes a BeiDou time service unit and a storage unit. The BeiDou time service unit can output, in real time, high-precision time information (with a precision of 30 ns and a resolution of 1 µs) in synchronization with the BeiDou time; and after authorization by the relevant operator, the roadside end can send an obstacle status message, and synchronously acquires the BeiDou time information by the BeiDou time service unit in a test process. The acquired time information and the obstacle status message are packaged and sent together by the roadside end. By ignoring the time consumed in program execution, the acquired BeiDou time is the time of sending the obstacle message, which is recorded as $t_1$. The memory can locally store and back up the packaged data, to avoid a packet loss and other exceptions during communication between the roadside end and the vehicle end, thus guaranteeing the test and evaluation.

Step 2: Establishment of the Vehicle-End Information Acquisition Module and Parameter Measurement The vehicle-end information acquisition module includes a combined inertial navigation unit, an audio/vibration signal acquisition unit, a single chip microcomputer (SCM) embedded unit, and a memory unit. The combined inertial navigation unit can output information such as a pulse per second (PPS), a high-precision position/velocity/time at 20 Hz, etc. The audio/vibration signal acquisition unit is a sound and vibration sensor and can convert a sound and vibration signal for AEBS warning into an electrical signal.

The SCM embedded unit includes at least two analog-digital converters and at least two timing counters. The two analog-digital converters are respectively used for converting the electrical signals acquired by the sound sensor and the vibration sensor into digital signals. One of the timing counters (a first timing counter) is used for accurately calculating the time at which the vehicle end receives a roadside-end message, and its specific working procedure is: (1) recording the time in integer seconds corresponding to the PPS after the PPS signal is received, and starting the first timing counter after reset; (2) after receiving the message sent from the roadside end, immediately storing, by the vehicle end, a count value of the first timing counter; and (3) adding the PPS integer seconds to the counting duration to calculate the accurate time of receiving the roadside message, which is recorded as $t_2$.

The other timing counter (a second timing counter) is used for periodically controlling the analog-digital converters and acquiring the start time of the analog-digital converters. In order to meet the test and evaluation requirements of the present disclosure, an audio/vibration signal acquisition frequency is set to 100 Hz, and a specific working procedure of the second timing counter is: (1) when the PPS arrives, recording the corresponding time in integer seconds, and clearing the number N of conversions to zero and starting one analog-digital conversion by taking the PPS signal as a basis reference for starting the analog-digital converters; (2) performing time counting when the second timing counter is started for 10 ms; (3) starting one analog-digital conversion at each 10 ms when the time counting ends, and adding one to the number N of conversions; and (4) after the analog-digital conversion ends, packaging and storing the acquired digital signal and its corresponding conversion starting time, where the conversion starting time is a sum of the time in integer seconds and N multiplied by 10 ms. This method can ensure that the analog-digital converters acquire the audio/vibration signal at a high frequency of 100 Hz, and performs time alignment at each second, thus guaranteeing the estimation accuracy of the signal acquisition time.

The memory locally stores the roadside-end message received by the vehicle end and its corresponding accurate time, information acquired by the combined inertial navigation unit, and the audio/vibration information acquired by the SCM embedded unit, providing a data basis for the integrated information processing module.

Step 3: Establishment of the Integrated Information Processing Module and an Evaluation Method Mounted at the vehicle end, the integrated information processing module of the present disclosure processes basic data acquired by the roadside-end and vehicle-end information acquisition modules, and makes an evaluation of two indexes: a communication delay and whether to issue a warning when the TTC is greater than 2.7 s to 4.4 s.

Processing and evaluation for the communication delay: $t_1$ acquired in steps 1 and 2 is the time of the roadside end sending a message and $t_2$ is the time of the vehicle end receiving the message; and a difference value between $t_1$ and $t_2$ is the delay. When the delay is less than 20 ms, it is determined that the communication delay meets the standard requirement; or otherwise, it is determined that it does not meet the standard requirement.

Processing of the sending time of the warning information and evaluation: First, it is determined, by setting a threshold, whether the audio/vibration signal is in a warning status; and an audio/vibration signal that first reaches the warning status is found and the time corresponding to this signal is recorded, the time is the warning time T. To calculate the TTC at the time T, it is required to know the position and velocity information of the current vehicle at the time T. However, the position/velocity information and the audio/vibration information do not match in frequency (the position/velocity information output in the combined inertial navigation is 20 Hz, while the audio/vibration signal acquisition frequency is 100 Hz). In order to accurately calculate the TTC at the time T, the position/velocity information needs to be interpolated. The present disclosure adopts a dynamic interpolation method based on a Support Vector Machine (SVM) to calculate the velocity and position information corresponding to the time T.

The interpolation condition of the general polynomial interpolation method is the coordinates of each node; and although the curves can be kept steady (relatively flat) during piecewise interpolation with a low-order function, the connections between the piecewise curves cannot be kept smooth. The position and velocity of the vehicle are continuously variable quantities, and curves at each time should all be smooth. A Hermite interpolation method specifies not only the coordinate values of each node, but also the derivative of each order of the curve at each node. In this way, the steadiness of the curve can be ensured, and further the connections can be ensured to be smooth enough, thus matching the characteristic that both the vehicle velocity and position information are continuously variable quantities.

A Hermite interpolation equation is established in the following process: Assuming that a function value of a known function $y=f(x)$ is $y_i=f(x_i)$ at an interpolation node $x_i$ ($i=0, 1, 2 \ldots n$) and a first-order derivative value is $m_i=f'(x_i)$ ($i=0, 1, 2 \ldots n$), the Hermite interpolation polynomial $H(x)$ meets:

$$\begin{cases} H(x_i) = y_i \\ H'(x_i) = m_i, i = 0, 1, \ldots, n \end{cases} \quad (1)$$

then, the Hermite interpolation polynomial may be expressed as follows:

$$H(x)=a_0(x)y_0+\beta_0(x)m_0+a_1(x)y_1+\beta_1(x)m_1+ \ldots +a_n(x)y_n+\beta_n(x)m_n \quad (2)$$

According to the experience of engineering practice, the Hermite interpolation method generally has an order of no more than 3. A third-order Hermite interpolation expression may be written as follows:

$$H(x) = y_0 a_0(x) + y_1 a_1(x) + m_0 \beta_0(x) + m_1 \beta_1(x) \qquad (3)$$

$$\begin{cases} a_0(x) = \dfrac{(x_1 - 3x_0 + 2x)(x_1 - x)^2}{(x_1 - x_0)^3} \\ a_1(x) = \dfrac{(3x_1 - x_0 + 2x)(x - x_0)^2}{(x_1 - x_0)^3} \\ \beta_0(x) = \dfrac{(x_1 - x_0)(x - x_1)^2}{(x_1 - x_0)^2} \\ \beta_1(x) = \dfrac{(x - x_0)^2 (x - x_1)}{(x_1 - x_0)^2} \end{cases}$$

where

When the lateral velocity and the yaw velocity of the vehicle are relatively large, the degree of non-linearity between adjacent velocity and position nodes is high, and a relatively high order is required in this case to achieve accurate interpolation. On the contrary, when the lateral velocity and the yaw velocity of the vehicle are relatively small, the degree of non-linearity between adjacent velocity and position nodes is low, and a relatively low order is required in this case to implement interpolation, thus reducing the computation while guaranteeing the interpolation accuracy, and saving the computational costs. In order to determine the order of the Hermite interpolation method, dynamic decision-making is performed by using an SVM-based method, where the SVM is a classifier widely used in the engineering field to solve multiple kinds of regression and classification problems. Input quantities of an SVM model are the lateral velocity and the yaw velocity of the vehicle, and an output quantity is the order of the Hermite interpolation method. In order to attain a relatively good decision-making result, it is required to train the SVM model in advance.

In order to train an SVM-based order estimation module, it is required to make training samples. The training samples in the present disclosure are made by using the position/velocity data at 1 Hz for interpolation modeling and the position/velocity data at 20 Hz as true values, to calculate the order at the minimum error, namely, the output Y=[γ] of the SVM model, where γ is the model order. The input of the SVM model is the vehicle lateral velocity and yaw velocity corresponding to the time at which the position or velocity modeling node is located, namely, the input X=[$v_{y1}$ $v_{y2}$ $\omega_1$ $\omega_2$] of the SVM model, where vy1 is the lateral velocity corresponding to a node 1, vy2 is the lateral velocity corresponding to a node 2, ω1 is the yaw velocity corresponding to the node 1, and ω2 is the yaw velocity corresponding to the node 2.

The essence of the SVM model is a binary classification model, which classifies the modeling orders based on the lateral velocity and the yaw velocity of the vehicle. The maximum value of the model orders in the samples is the number of the SVM binary classification models to be trained, and the maximum order in the present disclosure is 3, which indicates that three SVM binary classification models need to be trained. Each model is established in the following process:

setting $S=\{s_i, l_i\}_{i=1}^X$, where $s_i \in R^n$ is a feature vector and $l_i \in \{-1, 1\}$ is a label of a training sample set, and defining a hyperplane equation as follows:

$$w^T S + b = 0 \qquad (4)$$

where w is a weight vector and b is the bias. Then any training sample should meet:

$$l_i(w^T s_i + b) \geq 1 \qquad (5)$$

In order to find an optimal hyperplane, a distance r from any point Si in the sample space to the optimal hyperplane is defined as follows according to knowledge of analytical geometry:

$$r = \frac{w_0^T s_i + b_0}{\|w_0\|} \qquad (6)$$

From the formula (6), a distance from a sample point to the hyperplane is:

$$r_i = \pm \frac{1}{\|w_0\|} \qquad (7)$$

It can be known from the formula (7) that, to find the optimal hyperplane, it is only required to minimize $\|w_0\|$, and in this case, an optimization problem may be converted to calculation of the following term (8) under the constraint of the formula (5):

$$\min \frac{\|w\|^2}{2} \qquad (8)$$

The Lagrangian function is introduced, to obtain:

$$L(w, b, \alpha) = \frac{1}{2} w^T w - \sum_{i=1}^{n} \alpha_i [l_i(w^T s_i + b) - 1] \qquad (9)$$

where $\alpha_i \in r (i=1, \ldots, N)$ is the Lagrangian operator.

Because the actual data cannot be partitioned completely linearly, a penalty coefficient G is introduced to obtain the optimization problem after Lagrangian transformation:

$$\max_{\alpha} \sum_{j=1}^{n} \alpha_i - \frac{1}{2} \sum_{i,j=1}^{n} \alpha_i \alpha_j l_i l_j s_i^T s_j \qquad (10)$$

$$\text{s.t. } 0 \leq \alpha_i \leq C, \sum_{i=1}^{n} \alpha_i l_i = 0, i = 1, 2, \ldots, n$$

α is calculated through the formula (10) and w is calculated through $$w = \sum_{i=1}^{n} \alpha_i l_i s_i,$$

thus obtaining a classification discrimination function:

$$f(s) = \text{sgn}\left(\sum_{i=1}^{n} \alpha_i l_i K(s_i, s) + b\right) \qquad (11)$$

where $\kappa(\cdot, \cdot)$ is a kernel function, and the present disclosure uses a Gaussian kernel function $$K(s_i, s) = \exp\left\{-\frac{\|s - s_i\|^2}{2\sigma^2}\right\};$$

and sgn(•) denotes a sign function.

After establishment completion of an SVM classification model, first, two closest time points $T_a$ and $T_b$ before and after the time T in combined inertial navigation data are separately determined. By using the lateral velocities and the yaw velocities of the vehicle at the time $T_a$ and $T_b$ as the input quantities, an appropriate order of the Hermite interpolation model is obtained. Then, interpolation equations regarding the position and velocity at the time $T_a$ and $T_b$ are respectively established, to calculate the position and velocity of the current vehicle at the time T, which are recorded as $P_s$ and $V_s$ respectively. A distance $x_c$ between vehicles can be calculated according to the position $P_s$ of the current vehicle and the position of an obstacle, and the TTC can be obtained by using its calculation formula:

$$TTC = \frac{x_c}{v_s} \quad (12)$$

When the TTC is greater than 2.7 s to 4.4 s, it is determined that the TTC meets the standard requirement; or otherwise, it is determined that it does not meet the standard requirement.

The present disclosure has the following advantages and significant effects:

(1) The test and evaluation method proposed by the present disclosure uses a BeiDou space-time reference to test and evaluate a communication delay and the sending time of the warning information of the type-II AEBS, where the roadside end and the vehicle end are both provided by external equipment with accurate BeiDou clock information; and the vehicle end measures the message receiving time and the audio/vibration warning information by means of an SCM-based hardware synchronization method, thus achieving accurate measurement of key time information required for test and evaluation of the type-II AEBS.

(2) The test and evaluation method proposed by the present disclosure does not have requirements for a communication system of the type-II AEBS and does not need to know a data protocol; and captures the warning sending time and other characteristics from the outside of the system, and performs data alignment and analysis by means of an SVM-based dynamic Hermite interpolation method, thus achieving an accurate test and evaluation result, convenient testing, and a wide range of application.

DETAILED DESCRIPTION OF THE EMBODIMENTS

Figure 1:
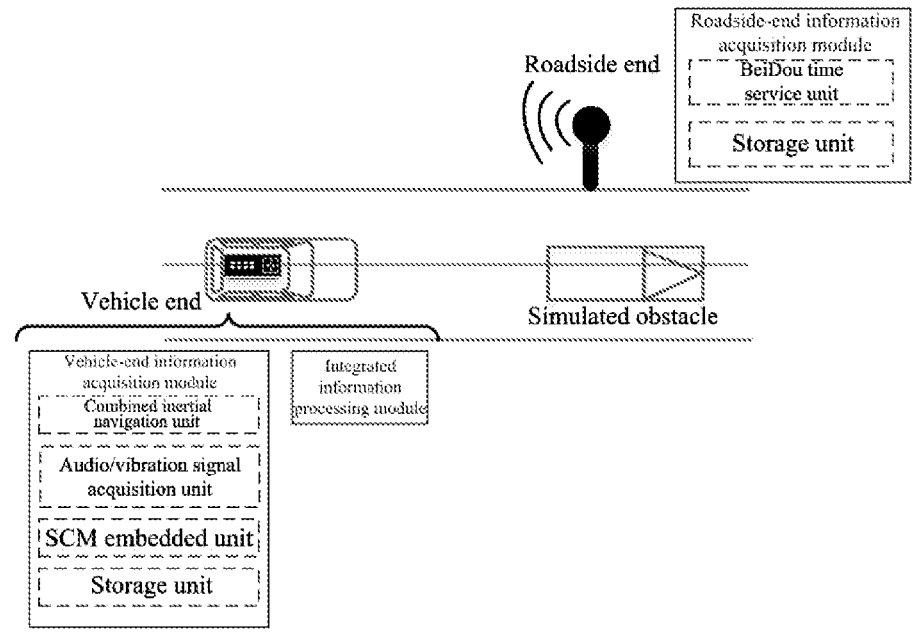
FIG. 1 is a schematic diagram of a test and evaluation scenario.

The AEBS is an active safety system that identifies, based on an environmental awareness sensor (millimeter-wave radar, a camera, etc.), the risk of collision with vehicles, pedestrians or other traffic participants in front to provide warning, and further implements braking by the system automatically triggering an actuator, so as to avoid or mitigate a collision.

The AEBS has been promoted as a pioneer of intelligent driving technology in the road transport industry. The European Union has mandated the installation of the AEBS in newly registered N2, N3, M2, and M3 commercial vehicles since Nov. 1, 2013. China has also set up relevant standards, including GB/T 38186-2019 Performance Requirements and Test Methods for Automatic Emergency Braking System of Commercial Vehicles, JT/T 1242-2019 Performance Requirements and Test Procedures for Automatic Emergency Braking System of Operating Vehicles, etc.; and related AEBS test methods are also given in the standards.

The AEBS is required to perform fusion decision processing for multi-source information in both the identification and decision-making process of collision risk; and has low reliability, a narrow application scope, and poor practicability if only relying on single-source information. With the development of vehicle-road collaboration technology, the AEBS is no longer limited to traditional vehicle sensors such as vision and radar sensors. Vehicle-road communication sensors can work in all-weather and all-terrain conditions, providing an important information source for the AEBS, and thus, AEBSs based on vehicle-road communication emerge. In order to make a distinction, the AEBS having the vehicle-road communication function is referred to as a type-II AEBS, while the AEBS not having the vehicle-road communication function is referred to as a type-I AEBS in the JT/T 1242-2019 standard. The performance of the type-II AEBS is also regulated in the JT/T 1242-2019 standard, including types of received and sent information, a direct communication delay, a communication distance, a warning issuing time, etc. However, this standard only stipulates the performance requirements and test scenarios for the type-II AEBS, but does not describe a test process and an evaluation method in detail.

A test and evaluation method for the type-I AEBS has already been reported in related invention patents, including a simulated test and evaluation method (VERIFICATION METHOD FOR AUTOMATIC EMERGENCY BRAKING SYSTEM AND CORRESPONDING VERIFICATION SYSTEM, application No. 201310089393.3), a real vehicle test and evaluation method (INTELLIGENT DRIVING AUTOMATIC EMERGENCY BRAKING PERFORMANCE TEST AND EVALUATION METHOD FOR COMBINED TEST ROAD, application No. 202010028039.X), etc. However, a test and evaluation method for the type-II AEBS has not yet been publicly reported. This patent discloses a performance test and evaluation method for the type-II AEBS, which specifically describes a test and evaluation method for two indexes: a vehicle-road communication delay and whether to issue a warning when the TTC is greater than 2.7 s to 4.4 s. The JT/T 1242-2019 standard requires that the type-II AEBS should have a vehicle-road communication function of "issuing a warning when the TTC or ETTC is greater than 2.7 s to 4.4 s", and further stipulates that "the first-level warning should be generated 1.4 s before the emergency braking phase, and the second-level warning should be generated 0.8 s before the emergency braking phase" in the warning manner. Therefore, the type-II AEBS is only required to make the first-level warning, namely, one of the auditory and tactile warnings. Identification of the warning signal from the type-II AEBS is identification of the auditory or tactile warning. The present disclosure unifies the sending and receiving time of vehicle-road communication messages and the warning signal sending time to the BeiDou time reference, thus implementing test and evaluation of whether the vehicle-road communication delay and the warning issuing time during the vehicle-road communication in the type-II AEBS meet the standard requirements.

The present disclosure aims to provide a type-II AEBS test and evaluation device based on a BeiDou space-time reference, which includes three parts: a roadside-end information acquisition module, a vehicle-end information acquisition module, and an integrated information processing module. The roadside-end information acquisition module is mounted at the road side, and the vehicle-end information acquisition module and the integrated information processing module are mounted in a test vehicle, as shown in FIG. 1, which can implement accurate and reliable test and evaluation for the type-II AEBS (AEBS) in a typical scenario based on the globally unified BeiDou space-time reference and by means of multi-target sensor fusion technology.

The present disclosure adopts the following technical solution: A type-II AEBS test and evaluation method based on a BeiDou space-time reference is provided, which is characterized in that: the present disclosure establishes a globally unified BeiDou space-time reference according to the characteristics of the type-II AEBS with a vehicle-road communication function; measures basic parameter information of the roadside end and vehicle end separately; and further implements accurate, quantitative test and evaluation of indexes such as a vehicle-road communication delay and warning signal sending time by means of multi-target sensor fusion technology. The method specifically includes the following steps:

Step 1: Establishment of the Roadside-End Information Acquisition Module and Parameter Measurement The roadside-end information acquisition module includes a BeiDou time service unit and a storage unit. The BeiDou time service unit can output, in real time, high-precision time information (with a precision of 30 ns and a resolution of 1 μs) in synchronization with the BeiDou time; and after authorization by the relevant operator, the roadside end can send an obstacle status message, and synchronously acquires the BeiDou time information by the BeiDou time service unit in a test process. The acquired time information and the obstacle status message are packaged and sent together by the roadside end. By ignoring the time consumed in program execution, the acquired BeiDou time is the time of sending the obstacle message, which is recorded as $t_1$. The memory can locally store and back up the packaged data, to avoid a packet loss and other exceptions during communication between the roadside end and the vehicle end, thus guaranteeing the test and evaluation.

Step 2: Establishment of the Vehicle-End Information Acquisition Module and Parameter Measurement The vehicle-end information acquisition module includes a combined inertial navigation unit, an audio/vibration signal acquisition unit, an SCM embedded unit, and a memory unit. The combined inertial navigation unit can output information such as a PPS, a high-precision position/velocity/time at 20 Hz, etc. The audio/vibration signal acquisition unit is a sound and vibration sensor and can convert a sound and vibration signal for AEBS warning into an electrical signal.

Figure 2:
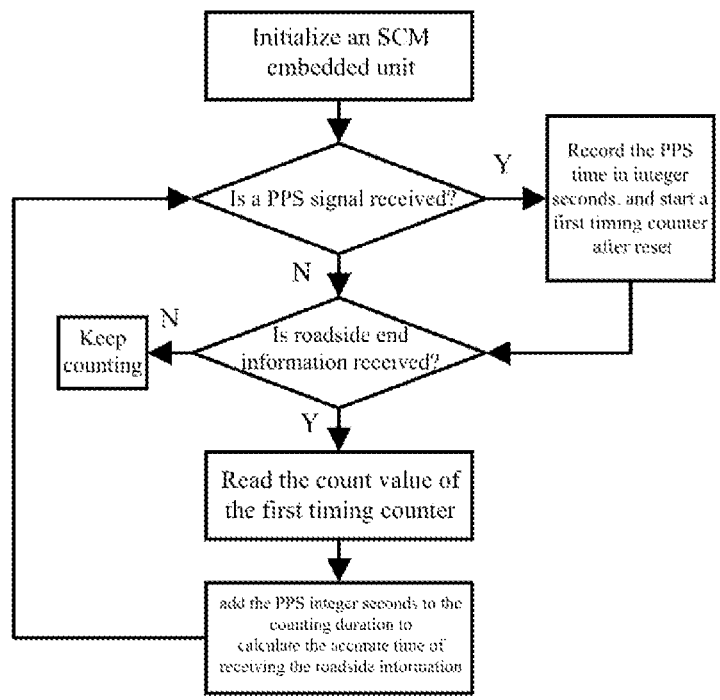
FIG. 2 is a time information acquisition flowchart showing that a vehicle end receives a roadside-end message.

The SCM embedded unit includes at least two analog-digital converters and at least two timing counters. The two analog-digital converters are respectively used for converting the electrical signals acquired by the sound sensor and the vibration sensor into digital signals. One of the timing counters (a first timing counter) is used for accurately calculating the time at which the vehicle end receives a roadside-end message, and its specific working procedure is shown in FIG. 2: (1) recording the time in integer seconds corresponding to the PPS after the PPS signal is received, and starting the first timing counter after reset; (2) after receiving the message sent from the roadside end, immediately storing, by the vehicle end, a count value of the first timing counter; and (3) adding the PPS integer seconds to the counting duration to calculate the accurate time of receiving the roadside message, which is recorded as $t_2$.

Figure 3:
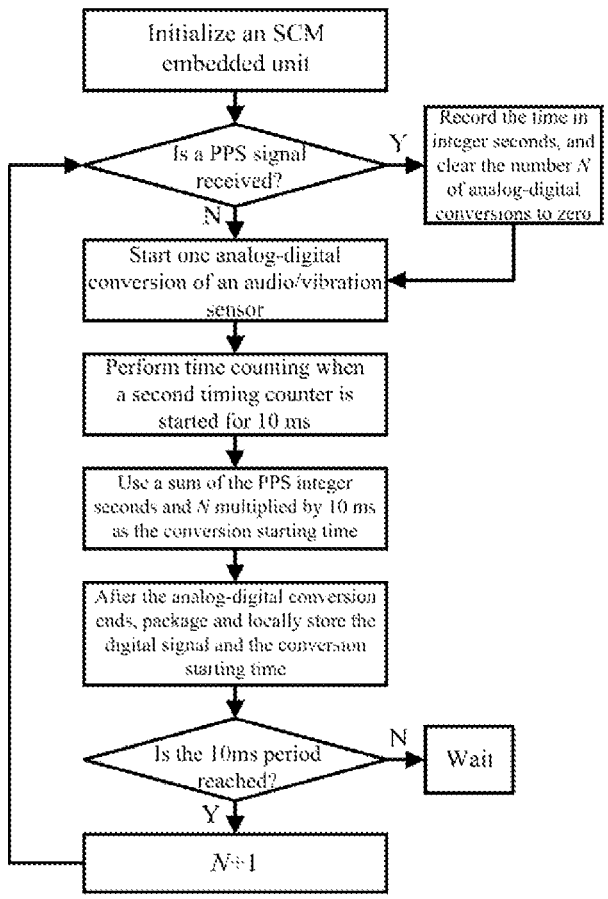
FIG. 3 is a flowchart of capturing vehicle-end warning information.

The other timing counter (a second timing counter) is used for periodically controlling the analog-digital converters and acquiring the start time of the analog-digital converters. In order to meet the test and evaluation requirements of the present disclosure, an audio/vibration signal acquisition frequency is set to 100 Hz, and a specific working procedure of the second timing counter is shown in FIG. 3: (1) when the PPS arrives, recording the corresponding time in integer seconds, and clearing the number N of conversions to zero and starting one analog-digital conversion by taking the PPS signal as a basis reference for starting the analog-digital converters; (2) performing time counting when the second timing counter is started for 10 ms; (3) starting one analog-digital conversion at each 10 ms when the time counting ends, and adding one to the number N of conversions; and (4) after the analog-digital conversion ends, packaging and storing the acquired digital signal and its corresponding conversion starting time, where the conversion starting time is a sum of the time in integer seconds and N multiplied by 10 ms. This method can ensure that the analog-digital converters acquire the audio/vibration signal at a high frequency of 100 Hz, and performs time alignment at each second, thus guaranteeing the estimation accuracy of the signal acquisition time.

The memory locally stores the roadside-end message received by the vehicle end and its corresponding accurate time, information acquired by the combined inertial navigation unit, and the audio/vibration information acquired by the SCM embedded unit, providing a data basis for the integrated information processing module.

Step 3: Establishment of the Integrated Information Processing Module and the Evaluation Method Mounted at the vehicle end, the integrated information processing module of the present disclosure processes basic data acquired by the roadside-end and vehicle-end information acquisition modules, and makes an evaluation of two indexes: a communication delay and whether to issue a warning when the TTC is greater than 2.7 s to 4.4 s.

Processing and evaluation for the communication delay: $t_1$ acquired in steps 1 and 2 is the time of the roadside end sending a message and $t_2$ is the time of the vehicle end receiving the message; and a difference value between $t_1$ and $t_2$ is the delay. When the delay is less than 20 ms, it is determined that the communication delay meets the standard requirement; or otherwise, it is determined that it does not meet the standard requirement.

Figure 4:
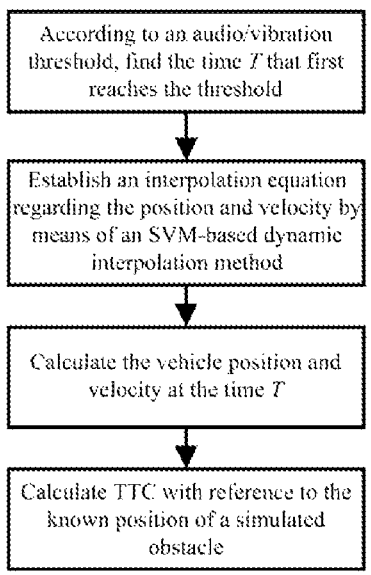
FIG. 4 is flowchart of test and evaluation of warning information sending time.
Figure 5:
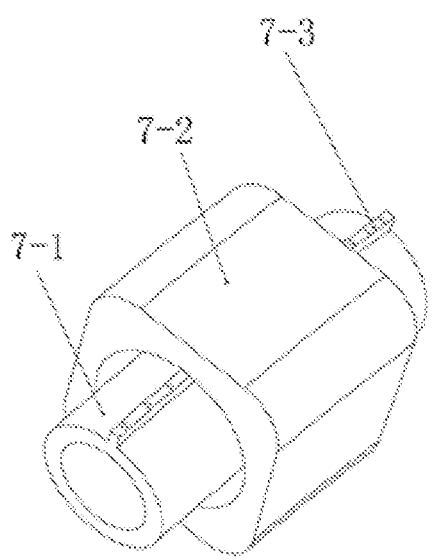

Processing and evaluation for the warning information sending time: A test and evaluation procedure is shown in FIG. 4. First, it is determined, by setting a threshold, whether the audio/vibration signal is in a warning status; and an audio/vibration signal that first reaches the warning status is found and the time corresponding to this signal is recorded, where the time is the warning time T. To calculate the TTC at the time T, it is required to know the position and velocity information of the current vehicle at the time T. However, the position/velocity information and the audio/vibration information do not match in frequency (the position/velocity information output in the combined inertial navigation is 20 Hz, while the audio/vibration signal acquisition frequency is 100 Hz). In order to accurately calculate the TTC at the time T, the position/velocity information needs to be interpolated. The present disclosure adopts an SVM-based dynamic interpolation method to calculate the velocity and position information corresponding to the time T.

The interpolation condition of the general polynomial interpolation method is the coordinates of each node; and although the curve can be kept steady (relatively flat) during piecewise interpolation with a low-order function, the connections between the piecewise curves cannot be kept smooth. The position and velocity of the vehicle are continuously variable quantities, and curves at each time should all be smooth. A Hermite interpolation method specifies not only the coordinate values of each node, but also the derivative of each order of the curve at each node. In this way, the steadiness of the curve can be ensured, and further the connections can be ensured to be smooth enough, thus according with the characteristic that both the vehicle velocity and position information are continuously variable quantities.

A Hermite interpolation equation is established in the following process: Assuming that a function value of a known function $y=f(x)$ is $y_i=f(x_i)$ at an interpolation node $x_i$ ($i=0, 1, 2 \ldots n$) and a first-order derivative value is $m_i=f'(x_i)$ ($i=0, 1, 2 \ldots n$), the Hermite interpolation polynomial $H(x)$ meets:

$$\begin{cases} H(x_i) = y_i \\ H'(x_i) = m_i, i = 0, 1, \ldots, n \end{cases} \quad (1)$$

then, the Hermite interpolation polynomial may be expressed as follows:

$$H(x)=a_0(x)y_0+\beta_0(x)m_0+a_1(x)y_1+\beta_1(x)m_1+\ldots+a_n(x)y_n+\beta_n(x)m_n \quad (2)$$

According to the experience of engineering practice, the Hermite interpolation method generally has an order of no more than 3. A third-order Hermite interpolation expression may be written as follows:

$$H(x)=y_0 a_0(x)+y_1 a_1(x)+m_0\beta_0(x)+m_1\beta_1(x) \quad (3)$$

where
$$\begin{cases} a_0(x) = \dfrac{(x_1 - 3x_0 + 2x)(x_1 - x)^2}{(x_1 - x_0)^3} \\ a_1(x) = \dfrac{(3x_1 - x_0 + 2x)(x - x_0)^2}{(x_1 - x_0)^3} \\ \beta_0(x) = \dfrac{(x_1 - x_0)(x - x_1)^2}{(x_1 - x_0)^2} \\ \beta_1(x) = \dfrac{(x - x_0)^2(x - x_1)}{(x_1 - x_0)^2} \end{cases}$$

When the lateral velocity and the yaw velocity of the vehicle are relatively large, the degree of non-linearity between adjacent velocity and position nodes is high, and a relatively high order is required in this case to achieve accurate interpolation. On the contrary, when the lateral velocity and the yaw velocity of the vehicle are relatively small, the degree of non-linearity between adjacent velocity and position nodes is low, and a relatively low order is required in this case to implement interpolation, thus reducing the computation while guaranteeing the interpolation accuracy, and saving the computational costs. In order to determine the order of the Hermite interpolation method, dynamic decision-making is performed by using an SVM-based method, where the SVM is a classifier widely used in the engineering field to solve a variety of regression and classification problems. Input quantities of an SVM model are the lateral velocity and the yaw velocity of the vehicle, and an output quantity is the order of the Hermite interpolation method. In order to attain a good decision-making result, it is required to train the SVM model in advance.

In order to train an SVM-based order estimation module, it is required to make training samples. The training samples in the present disclosure are made by using the position/velocity data at 1 Hz for interpolation modeling and the position/velocity data at 20 Hz as true values, to calculate the order at the minimum error, namely, the output $Y=[\gamma]$ of the SVM model, where $\gamma$ is the model order. The input of the SVM model is the vehicle lateral velocity and yaw velocity corresponding to the time at which the position or velocity modeling node is located, namely, the input $X=[v_{y1} \ v_{y2} \ \omega_1 \ \omega_2]$ of the SVM model, where $v_{y1}$ is the lateral velocity corresponding to a node 1, $v_{y2}$ is the lateral velocity corresponding to a node 2, $\omega_1$ is the yaw velocity corresponding to the node 1, and $\omega_2$ is the yaw velocity corresponding to the node 2.

The essence of the SVM model is a binary classification model, which classifies the modeling orders based on the lateral velocity and the yaw velocity of the vehicle. The maximum value of the model orders in the samples is the number of the SVM binary classification models to be trained, and the maximum order in the present disclosure is 3, which indicates that three SVM binary classification models need to be trained. Each model is established in the following process:

setting $S=\{s_i, l_i\}_{i=1}^N$, where $s_i \in R^n$ is a feature vector and $l_i \in \{-1,1\}$ is a label of a training sample set, and defining a hyperplane equation as follows:

$$w^T S+b=0 \quad (4)$$

where w is a weight vector and b is the bias. Then any training sample should meet:

$$l_i(w^T s_i+b) \geq 1 \quad (5)$$

In order to find an optimal hyperplane, a distance r from any point Si in the sample space to the optimal hyperplane is defined as follows according to knowledge of analytical geometry:

$$r = \frac{w_0^T s_i + b_0}{\|w_0\|} \quad (6)$$

From the formula (6), a distance from a sample point to the hyperplane is:

$$r_i = \pm \frac{1}{\|w_0\|} \quad (7)$$

It can be known from the formula (7) that, to find the optimal hyperplane, it is only required to minimize $\|w_0\|$, and in this case, an optimization problem may be converted to calculation of the following term (8) under the constraint of the formula (5):

$$\min \frac{\|w\|^2}{2} \qquad (8)$$

The Lagrangian function is introduced, to obtain:

$$L(w, b, \alpha) = \frac{1}{2}w^T w - \sum_{i=1}^{n} \alpha_i [l_i(w^T s_i + b) - 1] \qquad (9)$$

where $\alpha_i \in r(i=1, \ldots, N)$ is the Lagrangian operator.

Because the actual data cannot be partitioned completely linearly, a penalty coefficient G is introduced to obtain the optimization problem after Lagrangian transformation:

$$\max_{\alpha} \sum_{i=1}^{n} \alpha_i - \frac{1}{2} \sum_{i,j=1}^{n} \alpha_i \alpha_j l_i l_j s_i^T s_j \qquad (10)$$

$$\text{s.t. } 0 \leq \alpha_i \leq C, \sum_{i=1}^{n} \alpha_i l_i = 0, i = 1, 2, \ldots, n$$

$\alpha$ is calculated through the formula (10) and w is calculated through $$w = \sum_{i=1}^{n} \alpha_i l_i s_i,$$

thus obtaining a classification discrimination function:

$$f(s) = \text{sgn}\left(\sum_{i=1}^{n} \alpha_i l_i K(s_i, s) + b\right) \qquad (11)$$

where $K(\bullet,\bullet)$ is a kernel function, and the present disclosure uses a Gaussian kernel function $$K(s_i, s) = \exp\left\{-\frac{\|s - s_i\|^2}{2\sigma^2}\right\};$$

and sgn($\bullet$) denotes a sign function.

After establishment completion of an SVM classification model, first, two closest time points $T_a$ and $T_b$ before and after the time T in combined inertial navigation data are separately determined. By using the lateral velocities and the yaw velocities of the vehicle at the time $T_a$ and $T_b$ as the input quantities, an appropriate order of the Hermite interpolation model is obtained. Then, interpolation equations regarding the position and velocity at the time $T_a$ and $T_b$ are respectively established, to calculate the position and velocity of the current vehicle at the time T, which are recorded as $P_s$ and $V_s$ respectively. A distance $x_c$ between vehicles can be calculated according to the position $P_s$ of the current vehicle and the position of an obstacle, and the TTC can be obtained by using its calculation formula:

$$TTC = \frac{x_c}{v_s} \qquad (12)$$

When the TTC is greater than 2.7 s to 4.4 s, it is determined that the TTC meets the standard requirement; or otherwise, it is determined that it does not meet the standard requirement.

The test and evaluation method proposed by the present disclosure uses a BeiDou space-time reference to test and evaluate a communication delay and warning information sending time of the type-II AEBS, where the roadside end and the vehicle end are both provided by external equipment with accurate BeiDou clock information; and the vehicle end measures the message receiving time and the audio/vibration warning information by means of an SCM-based hardware synchronization method, thus achieving accurate measurement of key time information required for test and evaluation of the type-II AEBS. In addition, the test and evaluation method proposed by the present disclosure does not have requirements for a communication system of the type-II AEBS and does not need to know a data protocol; and captures the warning sending time and other characteristics form the outside of the system, and performs data alignment and analysis by means of an SVM-based dynamic Hermite interpolation method, thus achieving an accurate test and evaluation result, convenient testing, and a wide range of application.

What is claimed is:

1. A Type-II Autonomous Emergency Braking System (AEBS) test and evaluation device based on a BeiDou space-time reference, comprising:
   a roadside-end information acquisition module mounted at a road side, the roadside-end information acquisition module including a BeiDou time service unit that acquires accurate time of sending a roadside-end message,
   a vehicle-end information acquisition module, and an integrated information processing module mounted in a test vehicle, the vehicle-end information acquisition module including a combined inertial navigation unit, an audio/vibration signal acquisition unit and a Single Chip Microcomputer (SCM) embedded unit, the combined inertial navigation unit outputting position/velocity/time information, and the audio/vibration signal acquisition unit converting a sound and vibration signal for AEBS warning, the SCM embedded unit acquiring accurate time of receiving the roadside-end message based on the sound and vibration signal converted by the audio/vibration signal acquisition unit; and the integrated information processing module implements accurate, quantitative test and evaluation of indexes including a vehicle-road communication delay between the time of sending the roadside-end message and the time of receiving the roadside-end message, and warning signal sending time based on the position/velocity/time information, the sound and vibration signal and the communication delay.

2. A test and evaluation method by the AEBS test and evaluation device based on the BeiDou space-time reference according to claim 1, wherein the BeiDou space-time reference is established according to characteristics of the type-II AEBS with a vehicle-road communication function; roadside-end and vehicle-end basic parameter information is measured separately; and further, the accurate, quantitative test and evaluation of indexes are implemented by means of multi-target sensor fusion technology,
   the method comprising the following steps:
   step 1: establishing the roadside-end information acquisition module and parameter measurement, wherein the roadside-end information acquisition module comprises the BeiDou time service unit and a storage unit, and the BeiDou time service unit is configured to output, in real time, high-precision time information in synchronization with BeiDou time; after authorization by a relevant operator, a roadside end sends an obstacle status message, and synchronously acquires BeiDou time information by the BeiDou time service unit in a test process; and the acquired BeiDou time information and the obstacle status message are packaged and sent together by the roadside end; by ignoring time consumed in program execution, the acquired BeiDou time is the time of sending the obstacle status message, which is recorded as $t_1$; and the storage unit locally stores and backs up the packaged data, to avoid a packet loss and other exceptions during communication between the roadside end and a vehicle end, thus guaranteeing the test and evaluation;

step 2: establishing the vehicle-end information acquisition module and parameter measurement, wherein the vehicle-end information acquisition module further comprises a memory unit; the combined inertial navigation unit is configured to output the information including a pulse per second (PPS) and a high-precision position/velocity/time at 20 Hz; and the audio/vibration signal acquisition unit is a sound and vibration sensor and configured to convert the sound and vibration signal for AEBS warning into an electrical signal;

the SCM embedded unit comprises at least two analog-digital converters and at least two timing counters; the at least two analog-digital converters are respectively used for converting the electrical signal acquired by the sound and vibration sensor into digital signals; and a first timing counter of the at least two timing counters is used for accurately calculating the time at which the vehicle end receives a roadside-end message, and a specific working procedure of the first timing counter is as follows: (1) recording the time in integer seconds corresponding to the PPS after a PPS signal is received, and starting the first timing counter after reset; (2) after receiving the message sent from the roadside end, immediately storing, by the vehicle end, a count value of the first timing counter; and (3) adding the PPS integer seconds to the counting duration to calculate the accurate time of receiving the roadside message, which is recorded as $t_2$;

a second timing counter of the at least two timing counters is used for periodically controlling the at least two analog-digital converters and acquiring the start time of the at least two analog-digital converters; and in order to meet the test and evaluation requirements, an audio/vibration signal acquisition frequency is set to 100 Hz, and a working procedure of the second timing counter is as follows: (1) when the PPS signal is received, recording the corresponding time in integer seconds, and clearing the number N of conversions to zero and starting one analog-digital conversion by taking the PPS signal as a basis reference for starting the at least two analog-digital converters; (2) performing time counting when the second timing counter is started for 10 ms; (3) starting one analog-digital conversion at each 10 ms when the time counting ends, and adding one to the number N of conversions; and (4) after the analog-digital conversion ends, packaging and storing the acquired digital signal and its corresponding conversion starting time, the conversion starting time being a sum of the time in integer seconds and N multiplied by 10 ms; and the memory unit locally stores the roadside-end message received by the vehicle end and its corresponding accurate time, information acquired by the combined inertial navigation unit, and the sound and vibration signal, providing a data basis for the integrated information processing module;

step 3: establishing the integrated information processing module and an evaluation method, wherein the integrated information processing module processes basic data acquired by the roadside-end and vehicle-end information acquisition module, and makes the evaluation of indexes: including the communication delay and whether to issue a warning when the time to collision (TTC) is greater than 2.7 s to 4.4 s;

processing and evaluation for the communication delay wherein $t_1$ acquired in steps 1 and 2 being the time of the roadside end sending a message and to being the time of the vehicle end receiving the message, and a difference value between $t_1$ and $t_2$ being the delay; and when the delay is less than 20 ms, determining that the communication delay meets the standard requirement; or otherwise, determining that it does not meet the standard requirement;

processing and evaluation for the warning information sending time wherein first, determining, by setting a threshold, whether the sound and vibration signal is in a warning status; finding the sound and vibration signal that first reaches the warning status and recording the time corresponding to this signal, the time being the warning time T, wherein, in order to accurately calculate the TTC at the time T, the position/velocity information is interpolated for matching a frequency of sound and vibration information and a frequency of position and velocity information of the current vehicle, and a dynamic interpolation method based on a Support Vector Machine (SVM) is used to calculate the velocity and position information corresponding to the time T, wherein a Hermite interpolation equation is established in the following process: assuming that a function value of a known function y=f(x) is $y_i$=f($x_i$) at an interpolation node $x_i$ (i=0, 1, 2 . . . n) and a first-order derivative value is $m_i$=f'($x_i$) (i=0, 1, 2 . . . n), the Hermite interpolation polynomial H(x) meeting:

$$\begin{cases} H(x_i) = y_i \\ H'(x_i) = m_i, i = 0, 1, \ldots, n \end{cases} \quad (1)$$

then, expressing the Hermite interpolation polynomial as follows:

$$H(x)=a_0(x)y_i+\beta_0(x)m_i+a_1(x)y_i+\beta_1(x)m_1+ \ldots +a_n(x)y_n+\beta_n(x)m_n \quad (2)$$

in order to train an SVM-based order estimation module, the training samples are made by using the position and velocity information at 1 Hz for interpolation modeling and the position and velocity information at 20 Hz as true values, to calculate the order at a minimum error, which is represented an output Y=[γ] of the SVM-SVM-based order estimation model, γ being the model order; and the input of the SVM-SVM-based order estimation model is vehicle lateral velocity and yaw velocity corresponding to the time at which a position or velocity modeling node is located, which is represented by an input $X=[v_{y1}\ v_{y2}\ \omega_1\ \omega_2]$ of the SVM model, $v_{y1}$ being the lateral velocity corresponding to a node 1, $v_{y2}$ being the lateral velocity corresponding to a node 2, $\omega_1$ being the yaw velocity corresponding to the node 1, and $\omega_2$ being the yaw velocity corresponding to the node 2;

the SVM-based order estimation model is a binary classification model, which classifies modeling orders based on the lateral velocity and the yaw velocity of the vehicle, wherein a maximum value of the modeling orders in the samples is the number of SVM binary classification models to be trained, and each model of the SVM binary classification models is established in the following process:

setting $S=\{s_i,l_i\}_{i=1}^{N}$, wherein $s_i \in R^n$ is a feature vector and $l_i \in \{-1,1\}$ is a label of a training sample set, and defining a hyperplane equation as follows:

$$w^T S + b = 0 \tag{3}$$

wherein w is a weight vector and b is the bias; and then any training sample meeting:

$$l_i(w^T s_i + b) \geq 1 \tag{4}$$

in order to find an optimal hyperplane, defining a distance r from any point Si in the sample space to the optimal hyperplane as follows according to knowledge of analytical geometry:

$$r = \frac{w_0^T s_i + b_0}{\|w_0\|} \tag{5}$$

wherein the formula (5), a distance from a sample point to the hyperplane is determined as follows:

$$r_i = \pm \frac{1}{\|w_0\|} \tag{6}$$

from the formula (6), to find the optimal hyperplane, an optimization problem is converted to calculation of the following term (7) under the constraint of the formula (4):

$$\min \frac{\|w\|^2}{2} \tag{7}$$

by introducing the Lagrangian function, the following formula is obtained:

$$L(w, b, \alpha) = \frac{1}{2} w^T w - \sum_{i=1}^{n} \alpha_i [l_i(w^T s_i + b) - 1] \tag{8}$$

wherein $\alpha_i \in r(i=1, \ldots, N)$ is the Lagrangian operator;

a penalty coefficient G is introduced to obtain the optimization problem after Lagrangian transformation:

$$\max_{\alpha} \sum_{i=1}^{n} \alpha_i - \frac{1}{2} \sum_{i,j=1}^{n} \alpha_i \alpha_j l_i l_j s_i^T s_j \tag{9}$$

$$\text{s.t. } 0 \leq \alpha_i \leq C, \sum_{i=1}^{n} \alpha_i l_i = 0, i = 1, 2, \ldots, n$$

$\alpha$ is calculated through the formula (9) and w is calculated through $$w = \sum_{i=1}^{n} \alpha_i l_i s_i,$$

thus obtaining a classification discrimination function:

$$f(s) = \text{sgn}\left\{\sum_{i=1}^{n} \alpha_i l_i K(s_i, s) + b\right\} \tag{10}$$

wherein $\kappa(\bullet,\bullet)$ is a kernel function, and a Gaussian kernel function $$K(s_i, s) = \exp\left\{-\frac{\|s - s_i\|^2}{2\sigma^2}\right\}$$

is used; and sgn(•) denotes a sign function;

after establishment completion of an SVM classification model, first, separately determining two closest time points $T_a$ and $T_b$ before and after the time T in combined inertial navigation data; by using the lateral velocities and the yaw velocities of the vehicle at the time $T_a$ and $T_b$ as the input quantities, obtaining an appropriate order of a Hermite interpolation model; then, respectively establishing interpolation equations regarding the position and velocity at the time $T_a$ and $T_b$, to calculate the position and velocity of the current vehicle at the time T, which are recorded as $P_s$ and $V_s$ respectively; and calculating a distance $x_c$ between vehicles according to the position $P_s$ of the current vehicle and the position of an obstacle, and obtaining the TTC by using its calculation formula:

$$TTC = \frac{x_c}{v_s} \tag{11}$$

when the TTC is greater than 2.7 s to 4.4 s, determining that the TTC meets the standard requirement; or otherwise, determining that it does not meet the standard requirement.

* * * * *